(12) United States Patent
Johnson et al.

(10) Patent No.: US 11,273,526 B1
(45) Date of Patent: Mar. 15, 2022

(54) SYSTEMS AND METHODS FOR APPLICATION OF STRESS CORROSION CRACKING RESISTANT COLD SPRAY COATINGS

(71) Applicants: Kyle William Johnson, Rapid City, SD (US); Jamie Walter Beard, Cookeville, TN (US); Bhaarat Kumar Jasthi, Rapid City, SD (US)

(72) Inventors: Kyle William Johnson, Rapid City, SD (US); Jamie Walter Beard, Cookeville, TN (US); Bhaarat Kumar Jasthi, Rapid City, SD (US)

( * ) Notice: Subject to any disclaimer, the term of this patent is extended or adjusted under 35 U.S.C. 154(b) by 0 days.

(21) Appl. No.: 16/521,716

(22) Filed: Jul. 25, 2019

Related U.S. Application Data

(60) Provisional application No. 62/865,486, filed on Jun. 24, 2019, provisional application No. 62/715,398, filed on Aug. 7, 2018.

(51) Int. Cl.
| | | |
|---|---|---|
| *B23P 6/00* | (2006.01) | |
| *C23C 24/04* | (2006.01) | |
| *B05B 7/14* | (2006.01) | |
| *G21F 5/00* | (2006.01) | |

(52) U.S. Cl.
CPC ............... *B23P 6/00* (2013.01); *B05B 7/144* (2013.01); *C23C 24/04* (2013.01); *G21F 5/00* (2013.01)

(58) Field of Classification Search
None
See application file for complete search history.

(56) References Cited

U.S. PATENT DOCUMENTS

| | | |
|---|---|---|
| 9,109,291 B2 | 8/2015 | Lamberton |
| 10,099,322 B2 | 10/2018 | Widener |
| 10,315,715 B2 | 6/2019 | Beard |
| 2006/0090593 A1 | 5/2006 | Liu |
| 2007/0031591 A1* | 2/2007 | Junker .................. C23C 24/04 427/140 |
| 2007/0181714 A1 | 8/2007 | Payne |

(Continued)

OTHER PUBLICATIONS

Stainless Steel Canister Challenges, Steve Marschman, NEET ASI Review Meeting, Sep. 17, 2014, U.S. Department of Energy, https://www.energy.gov/sites/prod/files/2015/08/f25/19.%20Stainless%20Steel%20Canister%20Challenges.pdf.

(Continued)

*Primary Examiner* — Jose I Hernandez-Kenney
(74) *Attorney, Agent, or Firm* — Jeffrey A. Proehl; Woods, Fuller, Shultz & Smith, PC

(57) ABSTRACT

Systems and methods for application of stress corrosion cracking resistant cold spray coatings include a method of forming a partial coating on a canister having a perimeter wall with a surface. The method may include identifying a compromised region on the surface of the wall of the canister, and impacting a substantially linear flow of particles of a powder against an area in the compromised region of the surface in a manner effective to cause the particles of the powder to bond to the surface of the wall to produce a coating on the area of the compromised region. The method may also include moving the substantially linear flow in a direction substantially parallel to the surface of the wall to cause the particles to impact an additional area of the compromised region to cause the particles to bond to the surface of the additional area.

19 Claims, 13 Drawing Sheets

(56) References Cited

U.S. PATENT DOCUMENTS

| | | | |
|---|---|---|---|
| 2009/0011123 A1* | 1/2009 | Bunting | C23C 4/08 427/142 |
| 2013/0340225 A1* | 12/2013 | Grubb | G21F 5/065 29/402.01 |
| 2014/0117109 A1* | 5/2014 | Widener | C23C 24/04 239/135 |
| 2014/0349007 A1 | 11/2014 | Lamberton | |
| 2016/0196887 A1* | 7/2016 | Singh | G21F 9/36 220/592.01 |
| 2018/0154960 A1 | 6/2018 | Beard, III | |
| 2019/0392960 A1 | 12/2019 | Wellwood | |

OTHER PUBLICATIONS

Dry Cask Storage System Inspection and Robotic Delivery System Development, Jeremy Renshaw, Keith Waldrop, 2016 RegCon Meeting, Electric Power Research Institute, Dec. 8, 2016.
In Use: Used Fuel Extended Storage, Electric Power Research Institute, Jan. 2017.

* cited by examiner

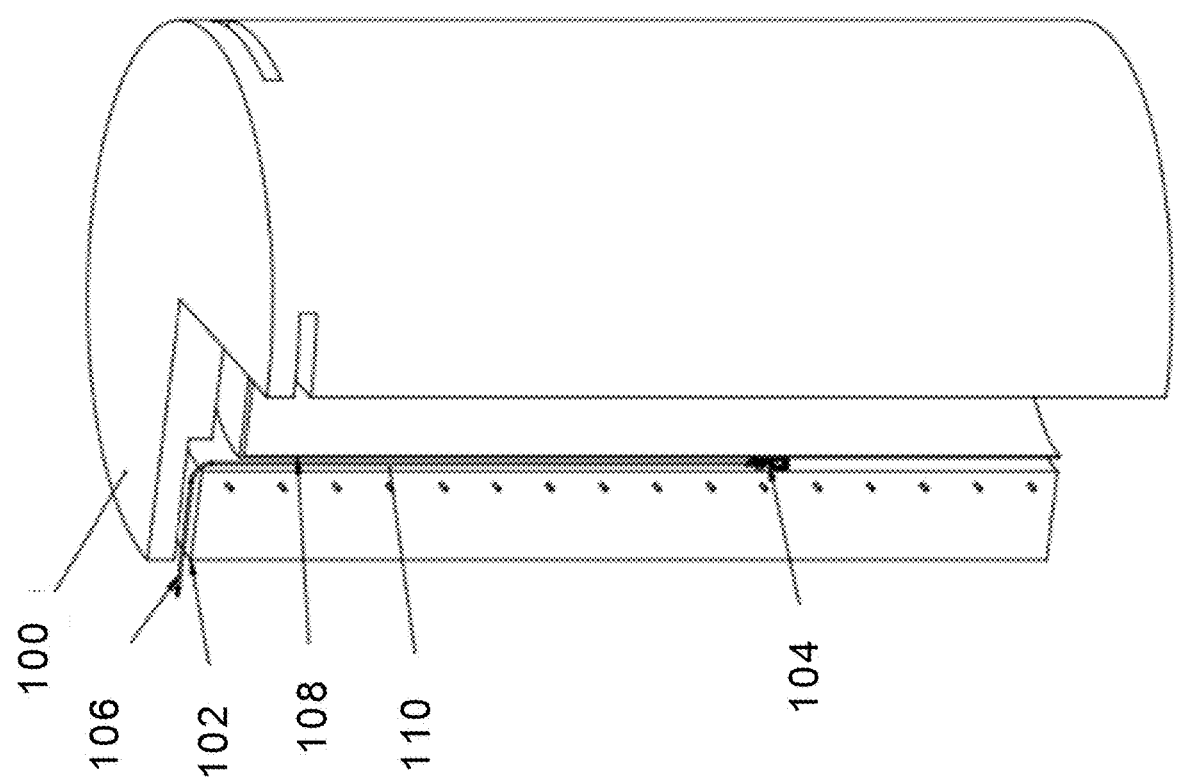

| Material | Spray gas | DE Estimate | Pitting resistant | Galvanically matched | Crack Resistant | Arrests cracks |
|---|---|---|---|---|---|---|
| 304L | Helium | 55% | | | • | |
| 316L | Helium | 47% | | • | • | • |
| 904L | Helium | 24% | | • | • | |
| In 625 | Helium | 7% | • | • | • | • |

FIG. 7D

SYSTEMS AND METHODS FOR APPLICATION OF STRESS CORROSION CRACKING RESISTANT COLD SPRAY COATINGS

REFERENCE TO RELATED APPLICATIONS

This application claims the benefit of U.S. Provisional Patent Application No. 62/715,398, filed Aug. 7, 2018 and U.S. Provisional Patent Application No. 62/865,486, filed Jun. 24, 2019, each of which is hereby incorporated by reference herein in its entirety.

STATEMENT REGARDING FEDERALLY SPONSORED RESEARCH OR DEVELOPMENT

This invention was made with government support under DE-SC0017855 awarded by Department of Energy. The government has certain rights in the invention

BACKGROUND

Field

The present disclosure relates to coating systems and more particularly pertains to new systems and methods for application of stress corrosion cracking resistant cold spray coatings for mitigation and repair of compromised regions of a container.

Description of the Prior Art

There is a critical need for a minimally invasive mitigation and repair technology to mitigate environmental, corrosion, shipping, and accidental damage to hazardous waste storage canisters, especially those located in areas inaccessible by traditional repair means. These hazardous waste storage canisters can include, for example, hazardous chemical storage containers, vitrified radioactive waste storage containers, Greater Than Class C (GTCC) nuclear waste storage canisters, horizontal spent fuel canisters, vertical spent fuel canisters, Dry Cask Storage Systems (DCSS), nuclear fuel transportation canisters, and other canisters storing hazardous and radioactive waste. For the purpose of this disclosure, these canisters and containers are collectively referred to as Hazardous Waste Containers (HWC). Typically, although not necessarily, when an HWC is positioned at a storage facility and loaded with waste, the HWC is positioned within an overpack container which is somewhat larger than the HWC so that a relatively thin annular gap is formed between the outer surface of the perimeter wall of the HWC and an inner surface of the overpack container which defines a chamber of the overpack container. The overpack container may include vent openings at upper and lower locations to allow air circulation into the annular gap.

Mitigation and repair of these HWC is especially critical for long term storage applications, where canister materials are exposed to the environment. Material degradation of canisters may occur during the extended storage period. One of the primary degradation modes of interest for welded canister designs is chloride-induced stress corrosion cracking (CISCC) of the canister due to sensitization of the stainless-steel material and tensile residual stress from the welding process used to form or close the canister. Other degradation mechanisms can include galvanic corrosion, pitting, or damage from transportation, loading, or natural disaster.

Developments in the long-term maintenance and repair of DCSSs are rather limited, as these systems have only been licensed for approximately the last 20 years and were not designed for long term storage. With the uncertainty facing long term, geologic storage facilities, long duration on-site waste storage is being now considered, and therefore only recently have long term degradation effects and mitigation and repair methods for these systems been considered.

Weld overlay cladding is one approach often used for corrosion control and substrate isolation as a corrosion and CISCC repair and mitigation strategy. However, welding leaves the material with degraded corrosion properties in the heat affected zone of the weld and introduces tensile residual surfaces stresses. The degraded corrosion properties can lead to pitting and CISCC initiation in those areas, and the tensile residual stresses can cause crack opening and propagation through the material.

Shot peening and laser shock peening are other approaches often used to introduce a layer of compressive residual surface stresses to eliminate CISCC concerns. However, these processes do not apply an isolation layer with superior corrosion resistance, so the material is still susceptible to pitting and corrosion, and eventually CISCC.

From the existing prior art in the DCSS industry, one notable example is found in U.S. Patent Application Publication No. 2013/0340225A1 entitled "SYSTEMS AND METHODS FOR CANISTER INSPECTION, PREPARATION, AND MAINTENANCE". This publication discusses a travel system for canister preparation, inspection and/or repair for both horizontal and vertical canister systems. The publication discusses inspection of the canisters using eddy current, dye penetrant, ultrasonic sensors, laser ultrasonic sensors, and/or visual sensors. The publication also discusses maintenance and repair of the canisters using dry ice blasting, repairing cracked welds, and applying protective coatings. However, the usage of cold spray is not discussed and the techniques discussed require the operator to remove the canister from the overpack container and transfer it through the sensing and repair ring which is attached to the overpack container, and therefore the techniques discussed in this publication may not be performed with the canister in-situ in the overpack container.

While patent and patent application publication documents relating to aspects of cold spray technology for certain applications are known, the applicants are unaware of any documents that discuss the use of cold spray techniques capable of use within a DCSS for CISCC mitigation and repair in-situ in the overpack container. For example, U.S. Patent Application Publication No. 2009/0011123A1 entitled "CORROSION PROTECTIVE COATING THROUGH COLD SPRAY" which discusses a cold spray coating process for applying a corrosion resistant coating in the specific context of turbine component repair. The document discusses the use of a corrosion resistant coating in which the coating material possesses superior corrosion resistance as compared to the parent material, but specifies the use of aluminum, magnesium, and silicon as the cold spray material. Additionally, nothing is disclosed about the application of compressive residual stress in the coating material. Another example, U.S. Patent Application Publication No. 2006/0090593A1 entitled "COLD SPRAY FORMATION OF THIN METAL COATINGS" discusses a cold spray process for applying thin layers of metallic material of about 1 micron in thickness, which is thinner than what is believed effective for the applications addressed by the present disclosure. The techniques discussed in this publication also employ large, hard spheres which would, if ever applied to a HWC, undesirably result in significant ablation of the HWC surface and generation of large amounts of debris within the overpack container. Further, U.S. Patent Application Publication No. 2007/0181714A1 discusses a cold spray nozzle for coating small diameter bores, however the apparatus is specifically intended not to adhere the powder to the surface making it unacceptable for the purpose of repairing a HWC.

Therefore, a safe method of mitigation and repair of CISCC in HWCs is desired that may not introduce thermal effects, that may introduce compressive residual stresses, that may apply a CISCC resistant isolation coating, and that may be done both prior to the container entering service (e.g., pre-service mitigation), while the container is in-service, and while the container is in-situ (e.g., for mitigation and repair).

SUMMARY

In one aspect, the present disclosure relates to a method of forming a partial coating on a canister having a perimeter wall with a surface. The method may comprise identifying a compromised region on the surface of the wall of the canister, and impacting a substantially linear flow of particles of a powder against an area in the compromised region of the surface in a manner effective to cause the particles of the powder to bond to the surface of the wall to produce a coating on the area of the compromised region. The method may further comprise moving the substantially linear flow in a direction substantially parallel to the surface of the wall to cause the particles of the powder to impact an additional area of the compromised region of the surface to cause the particles of the powder to bond to the surface of the additional area of the compromised region.

Aspects of the present disclosure utilize cold spray application of material to the surface of an HWC which may have a number of advantages over conventional approaches to HWC repair. For example, as compared to the use of a weld overlay on the surface of the HWC, cold spray techniques can deposit a coating with superior corrosion performance with no heat affected zone with compressive residual surface stresses. Therefore, the material is less susceptible to pitting and CISCC initiation and the compressive residual stresses act to close crack tips and stop crack propagation. As compared to shot peening of the HWC surface, cold spray techniques also apply compressive residual stress layer in the base material and the deposited isolation coating through very high velocity particle impact and bonding. Therefore, not only does cold spray apply crack closing compressive residual stresses, it further isolates the surface from corrosion attack with a corrosion resistant material.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIGS. 6A through 6C are schematic perspective views of the system for implementation of aspects of the present disclosure to a canister "in situ" or while hazardous materials are present in the canister without utilizing manipulation of the canister.

FIG. 7D is a table listing various testing results of utilizations of the cold spray system of the present disclosure.

DETAILED DESCRIPTION

Figure 1:
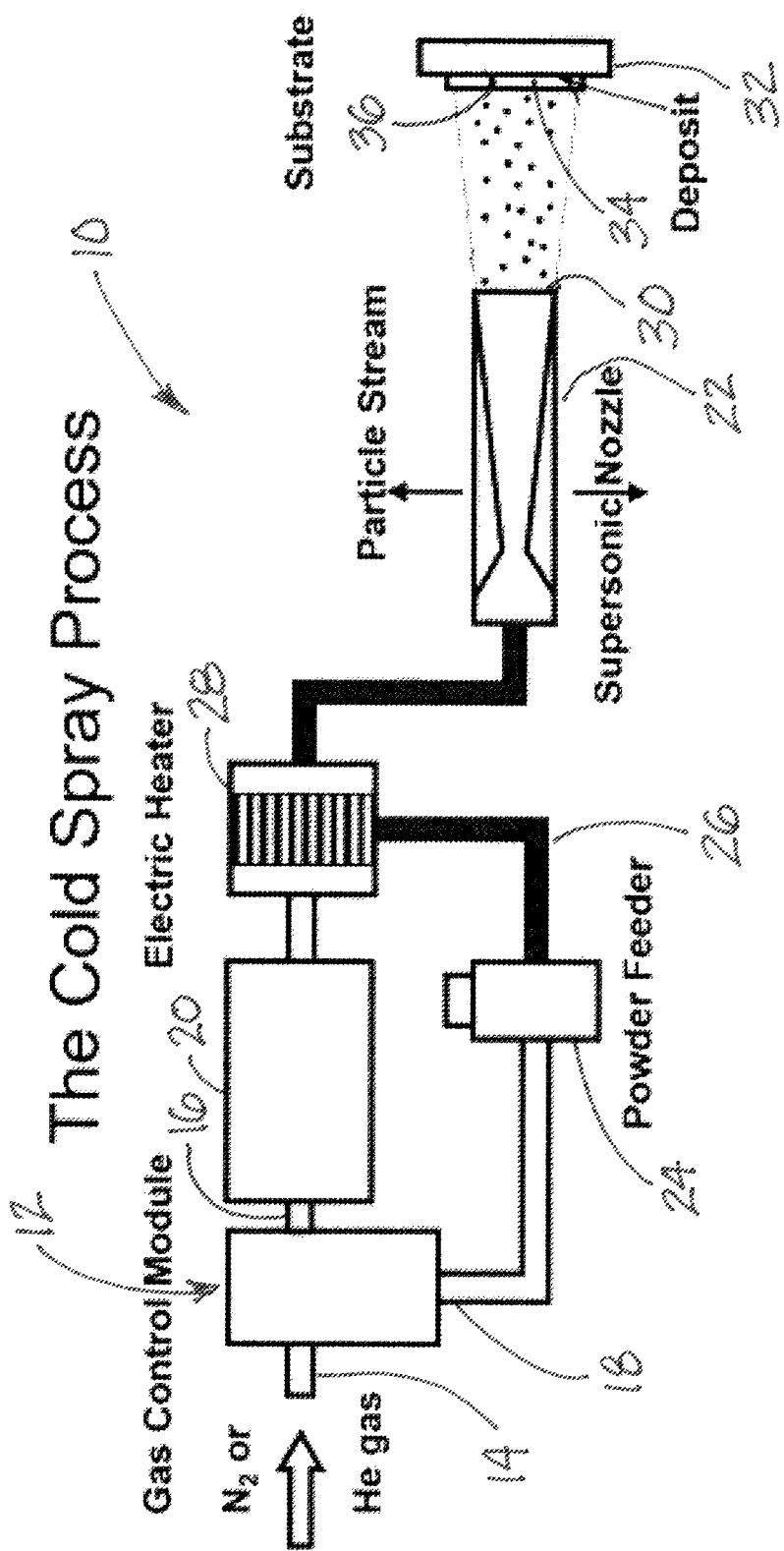
FIG. 1 is a schematic diagram of a high pressure, cold spray process suitable for use with aspects of the present disclosure.

With reference now to the drawings, and in particular to FIGS. 1 through 8 thereof, new systems and methods for application of stress corrosion cracking resistant cold spray coatings embodying the principles and concepts of the disclosed subject matter will be described.

Aspects of the present disclosure may provide several advantages that produce a superior solution for mitigation and repair of chloride-induced stress corrosion cracking (CISCC), specifically within regions of sensitized and high tensile residual stress, otherwise known as heat affected zones (HAZ) of welded hazardous waste containers (HWCs).

In accordance with one aspect of the disclosure, a high-pressure cold spray system may be provided to apply a coherent, dense cold spray coating on the container surface of the HWC. In a preferred embodiment, a high-pressure cold spray system such as is described in U.S. Patent Application Publication No. 2014/0117109 entitled "COLD SPRAY DEVICE AND SYSTEM" (which is hereby incorporated by reference in its entirety), is provided to apply the cold spray coating. In some implementations the cold spray applicator of the system may be manipulated by hand and in some implementations the cold spray applicator may be moved robotically over the container surface during the cold spray application.

In accordance with at least one embodiment of the present disclosure, a coating may be applied to the container surface of the HWC using high pressure cold spray. In embodiments of the disclosure, the coating may comprise metals of various types including 304(L), 316(L), 904(L), 410, Duplex Stainless Steel, Inconel 600, Inconel 625, Inconel 718, Nickel, C-276, K-500, or Ni—Cr—Mo alloy, or a metal matrix composite (MMC) with metal matrix matching the composition of those materials listed. In embodiments, the coating may comprise a Ni—Cr—Mo alloy or a metal matrix composite with a metal matrix consisting of a Ni—Cr—Mo alloy. In further embodiments, the coating may comprise a Ni—Cr—Mo pure ternary alloy having approximately 59 percent to approximately 64 percent Ni, approximately 20 percent to approximately 23 percent Cr, and approximately 16 percent to approximately 18 percent Mo.

Embodiments of the disclosure may include the introduction of compressive residual stresses provided by the high-pressure cold spray coating throughout the coating and into the container surface of the HWC for mitigating development of cracking and improving the corrosion resistance in a manner similar to shot peening.

In embodiments, the cold spray coating may be applied over the weld HAZ of the assembled HWC. The HWC, typically comprising steel, stainless steel, and/or nickel alloy, in the austenitic condition is susceptible to CISCC within the sensitized and high tensile residual stress weld HAZ. The cold spray coating applies compressive residual stress to the weld HAZ and may isolate the HAZ from the corrosive atmosphere. In implementations of the present disclosure, cold spray mitigation coatings may be applied pre-service (e.g., before the HWC is loaded with hazardous material) over weld HAZs. In other implementations, cold spray repair and/or mitigation coatings may be applied in the field (e.g., remote from the point of HWC fabrication) such as at or close to the location of the ultimate usage of the HWC for storage. In further implementations, cold spray repair and/or mitigation coatings may be applied using canister manipulation tooling, such as, inspection rings, such as is described in U.S. Patent Application Publication No. 2013/0340225 A1. In implementations, cold spray repair and/or mitigation coatings may be applied in-situ. Generally, in-situ application of cold spray repair and/or mitigation coatings may be defined as the application of cold spray to the container surface of the HWC without moving, hoisting, transferring, rotating, or otherwise disturbing the HWC. In the case of HWCs being used for spent nuclear fuel storage, in-situ repair and/or mitigation may be performed within the concrete overpack such that removal of the HWC from the overpack is not performed. In some implementations, cold spray repair and/or mitigation coatings are applied in-situ from inspection robots such as robots similar to those discussed in U.S. Pat. No. 10,315,715 entitled "MOBILE, CLIMBING ENDLESS TRACK ROBOTIC SYSTEM TO PERFORM REMOTE INSPECTIONS ON STRUCTURES" and U.S. Patent Application Publication No. 2018/0154960 entitled "CLIMBING VEHICLE USING SUCTION WITH VARIABLE ADAPTIVE SUSPENSION SEAL", both of which are hereby incorporated by reference in their entireties.

Cold spray systems useful for the practice of aspects of this disclosure are commercially available, including, for example the VRC Gen III Hybrid Portable High Pressure Cold Spray System available from VRC Metal Systems, 525 University Loop, Suite 211, Rapid City, S. Dak. 57701 USA., although other systems may be suitably adapted or configured for use according to the present disclosure.

For applications with restricted access, for instance in-situ mitigation and repair conducted within the overpack of a DCSS system, a high-pressure cold spray system with remote powder injection is typically required. For the practice of the present invention, the COLD SPRAY DEVICE AND SYSTEM, disclosed in U.S. Patent Application Publication No. 2014/0117109A1 discloses an apparatus that may be useful to remotely apply the cold spray coating according to the present disclosure.

The cold sprayed metal coating of the present disclosure may be created from powdered metal feedstock. The particles of the metal powder feedstock may have a plurality of sizes and shapes. Sizes as small as approximately 5 µm in diameter and large as approximately 100 µm in diameter can successfully be deposited using high pressure cold spray. Preferably, the powders are roughly approximately 18 µm to approximately 45 µm in diameter. Particles smaller than approximately 5 µm carry less momentum and may not be effectively carried through the substrate bow shock. Powders having particle sizes less than 5 µm may also pose safety and environmental concerns due to the ability of the particles to remain suspended in air for long periods of time. Therefore, powder particles smaller than approximately 18 µm may be excluded from the particles used for cold spraying using any suitable technique, such as, for example, using ultrasonic vibratory sieving, fluidized bed separation, or other particle size classification method. Particles larger than approximately 45 µm may also be similarly removed from the particles to be sprayed, due at least in part to their higher mass and inability to achieve critical velocity and be effectively deposited on the container surface. This powder classification may enhance high particle deposition efficiency, low porosity of the resulting coating, and high-quality characteristics of the coating. Powder morphology is also important in the cold spray process. The highest quality powders may be made using gas atomization techniques and may be highly spherical in shape, and thus may provide the best results for the techniques in this disclosure.

Suitable materials for the metal powders of the present disclosure may be composed of pure powders and blends containing the pure metal powders as a metal matrix, including, for example, titanium, chromium, cobalt, nickel, copper, zinc, niobium, molybdenum, silver, and tantalum. The most highly suitable materials making up the metal powders of the present disclosure may be selected from the group of highly corrosion resistant Fe, Ni, and/or Cr containing alloy materials including: 304/304L stainless steel, 316/316L/316Ti stainless steel, 904L stainless steel, 321 stainless steel, 410 stainless steel, and 2205 duplex stainless steel. Other highly suitable highly corrosion resistant Ni-, Cr-, and/or Mo-containing alloy materials may include: Alloy C-276, Alloy K-400, Alloy K-500, Alloy 22, Alloy 59, Alloy 600, Alloy 625, Alloy 718, or other Ni—Cr—Mo alloy. In some preferred embodiments of the present invention, the Ni—Cr—Mo pure ternary alloy having approximately 59 percent to—approximately 64 percent Ni, approximately 20 percent to approximately 23 percent Cr, and approximately 16 percent to approximately 18 percent Mo, hereafter referred to as Alloy 59, may be utilized in the practice of the disclosure. Metal powders useful in the implementations of the disclosure are typically commercially available. For example, Praxair Surface Technologies, 1500 Polco Street, Indianapolis, Ind. 46222, offers a wide variety of pure materials and alloys in classified spherical powders useful for the present invention, including Pure Nickel (NI-914-3), Alloy 718 (NI-202-2), and Alloy 625 (NI-328-5/1265F). Several other sources and other types of spherical and irregular metal powders are known to those skilled in the art and may be useful in practicing the invention.

For nuclear waste applications, it is desired that the metal, metal alloy, or metal blend forming the powder does not contain materials that are capable of forming long lived radioactive isotopes when exposed to neutron flux or other forms of radiation, such as cobalt. A preferred material for the particles used for the cold spray of the present disclosure excludes cobalt. Useful for application of the present disclosure in nuclear waste storage are those materials that have a relatively high neutron absorption cross-section, such as materials containing boron, gadolinium, and hafnium. Highly suitable are alloys of the materials for the particles listed above that are augmented to contain materials with a high neutron absorption cross section, such as, for example, the 316NU metal alloy powder commercially available from Carpenter Technology Corporation, 1735 Market Street, 15th Floor, Philadelphia, Pa. 19103 USA.

Materials making up the metal powders of the present invention may also be composed of powders blended from the materials listed previously with other metallic or ceramic particles. Those skilled in the art will recognize that innumerable metal powder blends could be applied in the present invention. Notwithstanding, metal matrix composites provide particular utility to implementation of the present disclosure, where a metal powder is blended with a ceramic or ceramic-containing powder. Metal powders making up the metal matrix may be selected from the group of highly corrosion resistant Fe-, Ni-, and/or Cr-containing materials, and Ni-, Cr-, and/or Mo-containing materials, as listed in this disclosure. Some of the most suitable materials for the metal matrix for CISCC resistant cold spray coating of the disclosure are those materials selected from the Ni—Cr—Mo alloys, including Alloy C-276, Alloy 625, and Alloy 59. Ceramic materials making up the hard phase of the metal matrix composite may be selected from the metallic carbides, including: chromium carbide, tungsten carbide, titanium carbide, molybdenum carbide, hafnium carbide, niobium carbide, tantalum carbide, tantalum niobium carbide, zirconium carbide, vanadium carbide, boron carbide, lanthanum carbide, manganese carbide, silicon carbide, tungsten tantalum carbide, tungsten titanium carbide, tungsten titanium tantalum carbide, and metallic oxides, including: aluminum oxide, aluminum titanate, chromium oxide, yttrium oxide, zirconium oxide, titanium dioxide, silicon dioxide, magnesium oxide, bismuth oxide, cesium oxide, cobalt oxide, copper oxide, iron oxide, gallium oxide, hafnium oxide, niobium oxide, tantalum oxide, tin oxide, zinc oxide, and manganese oxide. The most suitable material for the ceramic metal matrix composite hard phase may include the metal carbides of chromium, tungsten, niobium, tantalum, and hafnium, and metal oxides of zirconium and aluminum.

Useful for application of the present in nuclear waste storage are those ceramic blend materials making up the hard phase of the metal matrix composite that have high neutron absorption cross-section, such as boron carbide, boron nitride, gadolinium oxide, and hafnium carbide. These hard phase ceramic additions to the cold spray material can be added, blended, milled, or otherwise included in the aforementioned metal matrix materials for cold spray usage in the practice of the disclosure.

A depiction of basic elements of a high-pressure cold spray apparatus 10 is shown in FIG. 1. A gas at high pressure (e.g., approximately 300 psi to approximately 3000 psi) may be fed to a gas control element 12, where the gas flow 14 may be split into the a process gas flow 16 and a carrier gas flow 18. The process gas flow 16 is transferred to a high pressure (e.g., approximately 300 psi to approximately 1000 psi) heating element 20, where the gas is heated for delivery to the applicator nozzle 22. The carrier gas flow 16 may be transferred to a powder feeding module 24, where the particles of the powder are injected into the gas stream. The powder-containing gas stream 26 of the carrier gas flow 18 may be transferred to a mixing device 28 where the powder-containing carrier gas flow is mixed with the heated process gas flow 16 and injected into the nozzle 22. The applicator nozzle may be of the de Laval type, and may accelerate the combined gas flows to supersonic velocity, thereby accelerating the powder towards the nozzle exit 30. The high velocity powder is then directed toward the substrate 32, such as the substrate surface 34 upon which the powder is to be deposited, and upon impact, the powder is bonded to the substrate and/or previously deposited particles into a layer 36 of particles. The nozzle 22 may be moved or traversed, either by hand or robotically, generally parallel to the surface of the substrate such that the location at which the powder particles impact the surface 34 moves across the substrate to create a dense, uniform, and coherent coating on the substrate.

Figure 2:
FIG. 2 is a schematic cross-sectional micrograph of a cold spray coating formed according to the present disclosure.

An illustrative example of a cold spray coating exhibiting greater than 99% density is shown in FIG. 2. A cold spray application process may produce a high density, high hardness and cold worked microstructure with compressive residual stresses as opposed to the tensile residual stresses associated with fusion welding processes. During the cold spray application process, the metal powder particles typically do not reach melting temperatures, but are fused through kinetic energy transfer and adiabatic shearing processes, therefore substrate heating may be minimized, dimensional stability may be maintained, and unwanted thermal effects may be avoided such as the formation of a heat affected zone (HAZ), creation of thermal stresses, etc. Further, the cold spray application technique may provide the unique ability to adjust or "tune" the composition of the coating applied to meet the corrosion requirements of the components, through an understanding of the corrosion potentials of the substrate and coating.

Figure 3:
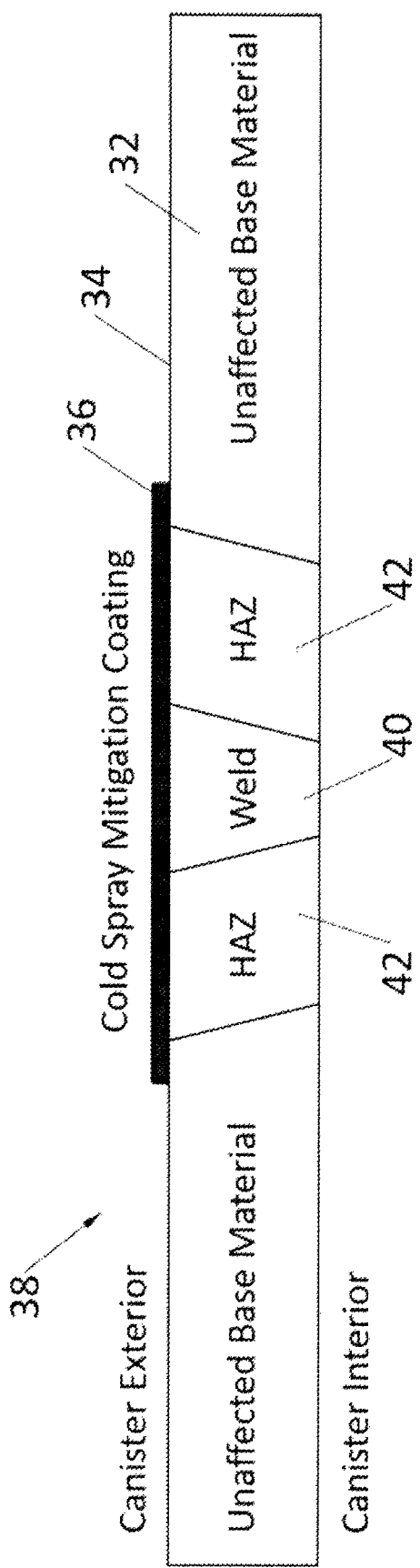
FIG. 3 is a schematic cross-sectional diagram of a section of the canister wall showing regions of a weld, heat affected zones (HAZ) of the base material and regions of the base material unaffected by the heat of the welding process, as well as a coating over the weld region and heat affected zone, according to an illustrative embodiment of the disclosure.

A cross-sectional depiction of a perimeter wall 38 of a HWC and a typical seam weld 40 used on HWCs is shown in FIG. 3, as well as the heat affected zones (HAZ) 42 of the wall 38 located adjacent to the weld 40 itself. Modeling and residual stress measurements both demonstrate that the welding process induces tensile residual stresses in the welded joints sufficient to initiate a stress corrosion crack (SCC). A SCC may be caused by several mechanisms, usually involving a susceptible material, a corrosive environment, and an applied or residual tensile stress. Austenitic stainless-steel alloys, such as ANSI 304/308, are often the primary materials used in HWCs, such as the large existing population of DCSS. These alloys have extreme corrosion and cracking resistance but are susceptible to SCC, especially after extended service life, exposure to temperatures above 60° C. and in the presence of chlorine containing environments (e.g., CISCC), such as those detected at the Diablo Canyon nuclear power plant and associated storage facility. Surface treatments are a key factor in the CISCC susceptibility of these alloys, and dry grinding results in less SCC resistance, and grit blasting or shot peening can increase the SCC which is likely a consequence of the surface stress state (e.g., tensile stress in the case of grinding vs. compressive stress in the case of blasting or peening). Thus, in at least some installations, an HWC may be made from a susceptible material, placed in a chlorine-containing environment, and have a tensile surface stress sufficient to initiate a crack. Implementation of aspects of the present disclosure may provide the application of a dense, corrosion resistant, isolation coating with compressive residual stresses directly over the weld and HAZ, thereby mitigating and repairing damage, CISCC, corrosion or otherwise.

In one highly suitable implementation of the present disclosure, a cold spray coating with thickness of approximately 0.015 inches (approximately 0.4 mm) to approximately 0.075 inches (approximately 2 mm) is applied over at least one weld, and in some cases every weld, present on the HWC, across an area of the container surface having a width of approximately 3 inches (approximately 76 mm) to approximately 6 inches (approximately 152 mm), with the area being substantially centered on the defect.

Figure 4:
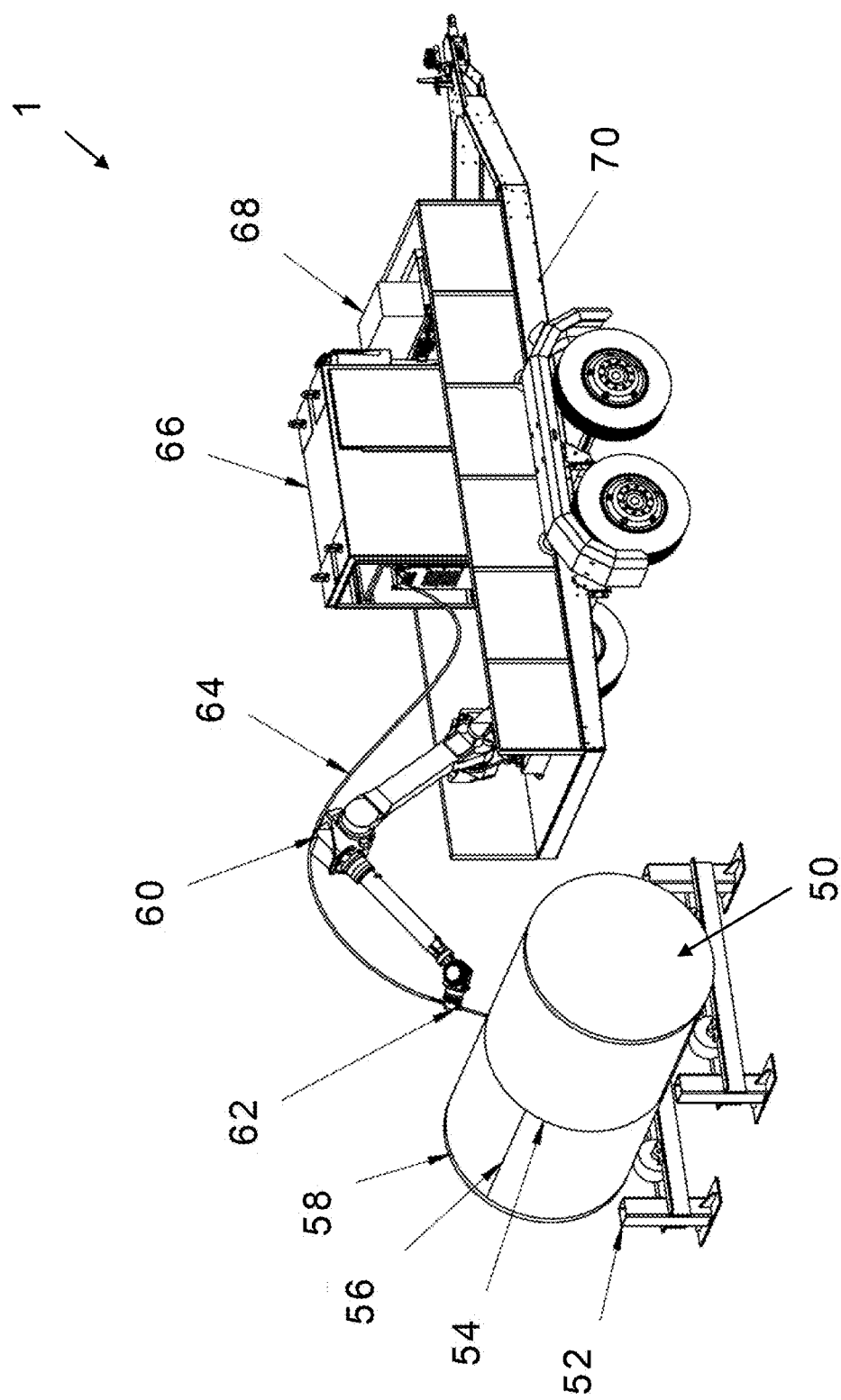
FIG. 4 is a schematic perspective view of a system for implementation of aspects of the present disclosure to a HWC "pre-service" or prior to hazardous materials being loaded into the HWC and prior to the HWC being positioned in the overpack container.

In one implementation of aspects of the disclosure, such as is illustratively depicted in FIG. 4, a cold sprayed CISCC mitigation coating may be applied to an HWC 50 prior to hazardous material being loaded into the HWC, which will be referred to in this description as "pre-service application". In embodiments, the HWC may be manipulated by commercially available manipulation equipment 52 while the cold spray mitigation coatings are applied to areas along and about the welds of the HWC, such as circumferential welded areas 54, longitudinal welded areas 56, and base welds 58. A commercially available robotic system 60 can be utilized to manipulate the cold spray applicator 62 to apply uniform and consistent coatings to the welded regions as discussed above. The cold spray process gas may be transferred to the cold spray applicator 62 using a high pressure, high temperature, flexible hose 64, and the powder and carrier gas flow 18 (e.g., powder-containing gas stream 26) may be separately transferred to the cold spray applicator using a high pressure flexible hose, and mixed by a mixing device 28 at or close to the cold spray applicator 62. In other embodiments, the cold spray process gas flow 16, the carrier gas flow 18, and powder may be transferred to the cold spray applicator 62 using a single high pressure, high temperature, flexible hose.

One highly suitable and commercially available cold spray system 66 for depositing the cold spray material is sold under the tradename "RAPTOR" by VRC Metal Systems. Other ancillary equipment such as dust collection, engineering controls, and robot controllers 68 may be mounted on a portable trailer system 70 for providing enhanced mobility for the system.

Through the practice of the implementations of the present disclosure, corrosion resistant cold sprayed material, such as Alloy 59, with compressive residual stresses can be applied as a pre-service mitigation strategy to potentially eliminate corrosion and CISCC concerns for the HWC processed according to aspects of the disclosure. In one highly suitable implementation, the cold spray pre-service application is performed on welded 304 or 316 stainless steel nuclear waste containers. Advantageously, usage of aspects of the present disclosure has the potential to decrease inspection and sustainment costs of HWC-based storage and improve the public opinion of long-term storage of spent nuclear fuel.

Figure 5:
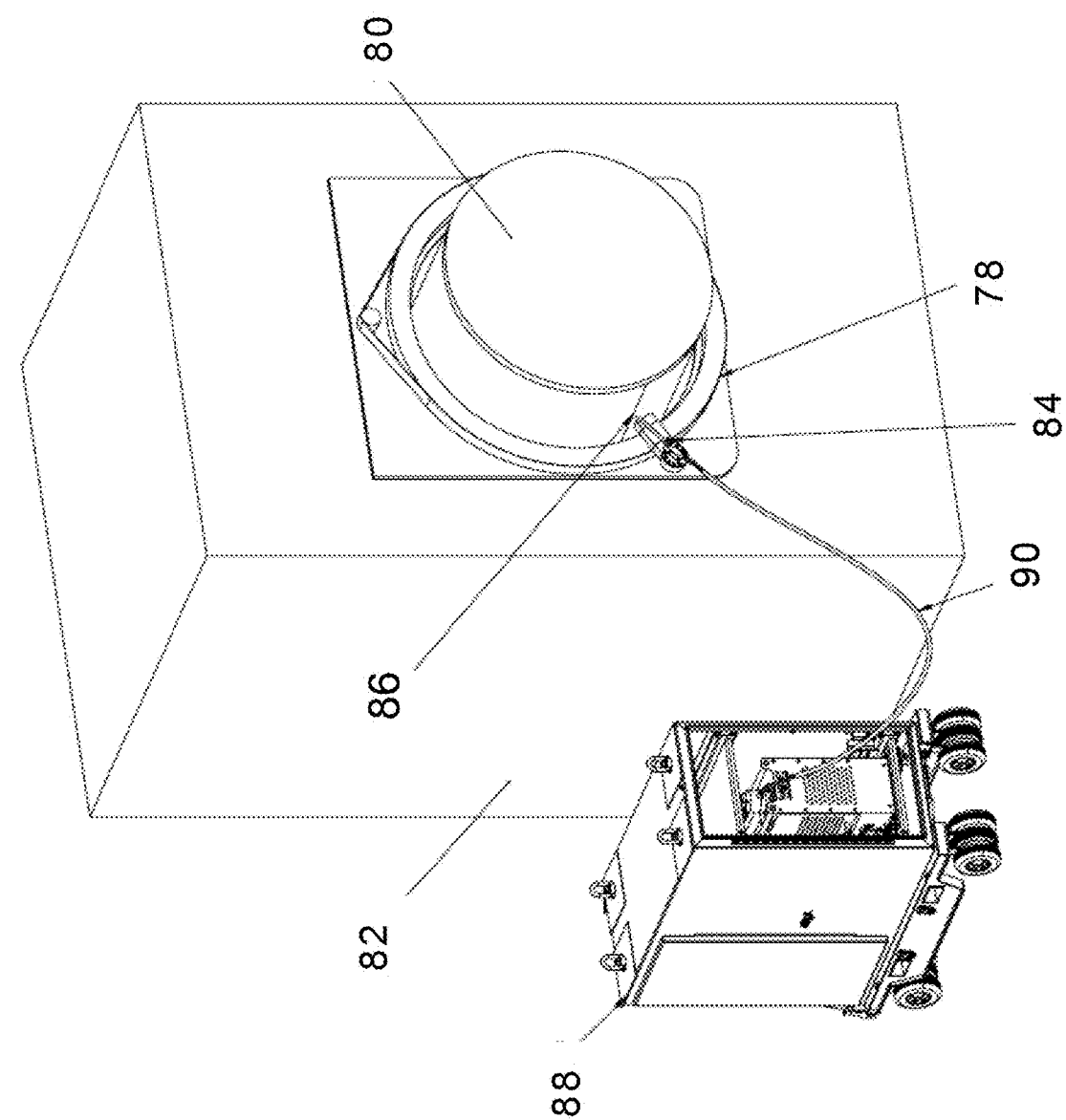
FIG. 5 is a schematic perspective view of a system for implementation of aspects of the present disclosure to a HWC "in-service" or while hazardous materials are present in the HWC utilizing manipulation of the HWC in the overpack container.

In another aspect of the present disclosure, cold spray repair and mitigation coatings can be applied to in-service HWCs, in particular, dry cask storage systems (DCSS) currently holding and storing hazardous material. An illustrative embodiment of the present disclosure, such as shown in FIG. 5, contemplates the application of cold spray repair and/or mitigation coatings may be applied to surfaces of loaded DCSS using canister manipulation equipment known to those skilled in the art. For example, aspects of the present disclosure may be practiced utilizing toroidal-shaped inspection devices, hereafter referred to as inspection rings 78, such as is disclosed in U.S. Patent Application Publication No. 2013/0340225A1 entitled "SYSTEMS AND METHODS FOR CANISTER INSPECTION, PREPARATION, AND MAINTENANCE". Although other inspection ring designs may be developed by others in the industry, one skilled in the art will recognize that aspects of the present disclosure may be practiced using other inspection ring designs. In the described embodiment, cold spray mitigation and/or repair coatings may be applied to a HWC loaded with nuclear fuel and currently in-service, hereafter referred to as in-service repair and/or mitigation processing. Aspects of the disclosed in-service processing typically require the HWC to be disturbed or manipulated, which is different from "in situ" repair and/or mitigation in which disturbance or manipulation is not required, and may be an important distinction between the respective processing.

In an implementation illustratively depicted in FIG. 5, a horizontal DCSS system, with a nuclear waste storage HWC 80 being removed from a horizontally-oriented cavity of a concrete overpack 82. Using techniques and apparatus such as is disclosed in U.S. Patent Application Publication No. 2013/0340225A1, one skilled in the art will recognize that aspects of the present disclosure may also be practiced using inspection ring devices designed for DCSS having a vertically-oriented cavity in the concrete overpack. The cold spray applicator 86 may be fixed to the rotary tool holder 84 and manipulated to move into a position over or adjacent to the site to be repaired and/or mitigated, such as a longitudinal weld seam 56. The cold spray applicator may be connected to a cold spray system 88 using a flexible, high pressure, high temperature hose 90. In one embodiment of the present invention, cold spray process gas is transferred to the cold spray applicator using a high pressure, high temperature, flexible hose. Optionally, powder and carrier gas may be separately transferred to the cold spray applicator using a high pressure flexible hose, and mixed at the cold spray applicator. In another embodiment, cold spray process gas, carrier gas, and powder is transferred to the cold spray applicator using a single high pressure, high temperature, flexible hose.

For the repair of cracks or pits in which the cold spray coating does not entirely fill the pit or crack, a technique of repair may be an embedded flaw repair in which the flaw may be completely encased by the cold spray coating, which may be effective in mitigating further damage at the damage site. Embedded flaw repair has been reviewed by the Nuclear Regulatory Commission (NRC), and has received a Safety Evaluation Report (SER) to allow its use for repairs in such situations.

Through the practice of aspects of the present disclosure, cold spray repair and mitigation coatings can be applied to in-service HWCs, in particular DCSS, without hoisting, manipulating, or otherwise disturbing the nuclear waste HWC, referred to herein as in-situ repair. An illustrative embodiment of the present disclosure, such as shown in FIG. 6A, contemplates the application of cold spray repair and mitigation coatings applied while the HWC is positioned in the DCSS overpack using inspection robots such as those disclosed in U.S. Pat. No. 10,315,715 and U.S. Patent Application Publication No. 2018/0154960. Although other inspection and repair robots may be developed by others in the industry, one skilled in the art will recognize that aspects of the present disclosure may be practiced using remotely controlled robot designs.

An illustrative cold spray robotic repair and/or mitigation may include elements delivered to a vertically-oriented DCSS through a concrete overpack 100 via the upper vent access 102 by means of robotic crawler 104. While the robotic cold spray apparatus depicted in FIG. 6A is shown in the context of a vertically-oriented DCSS in a vertically oriented chamber in the overpack, one skilled in the art will recognize that aspects of the present disclosure may also be practiced using remote control robotic platforms designed for horizontally-oriented DCSS situated in a vertically oriented overpack chamber.

Figure 6B:
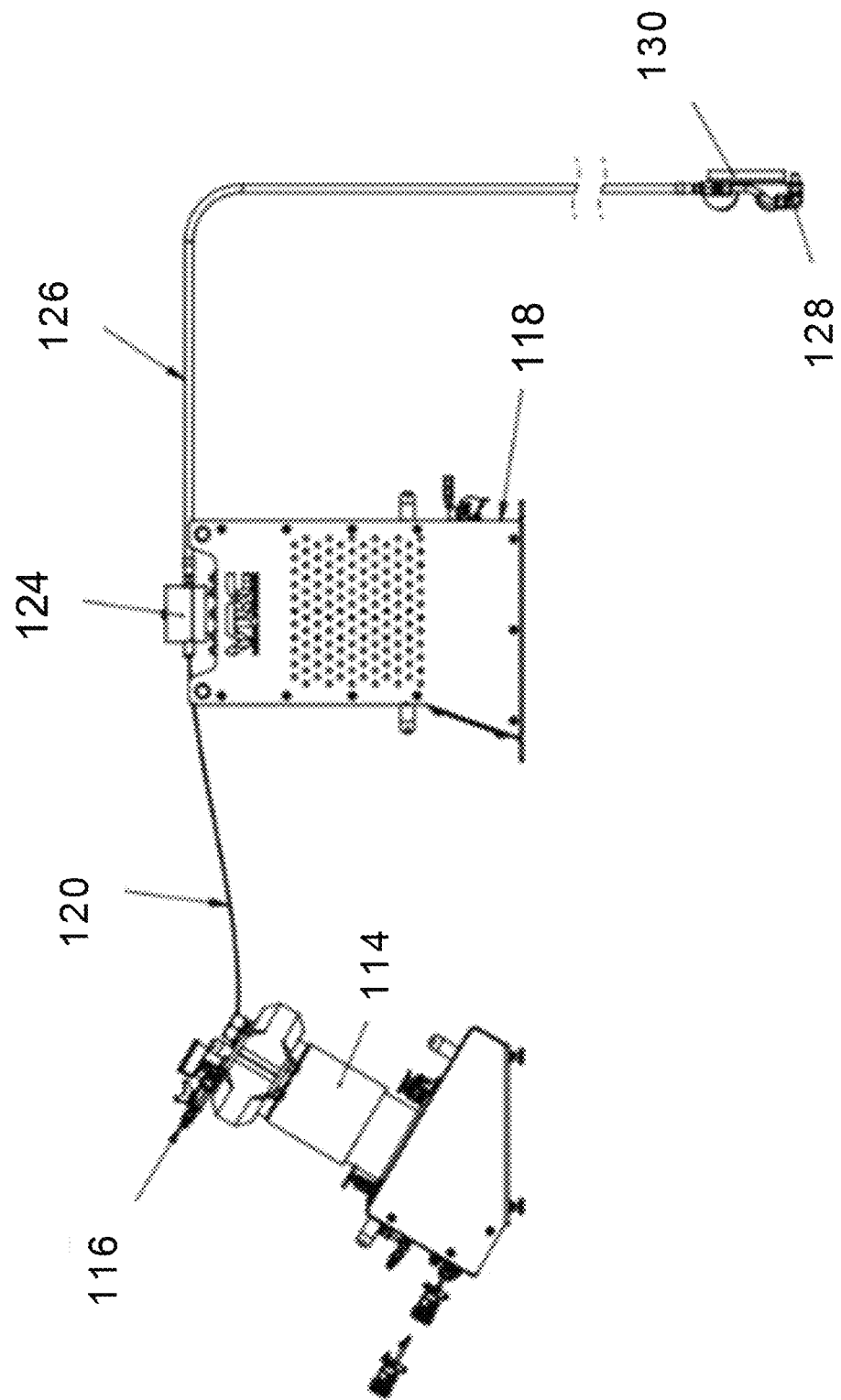

Illustratively, a flexible high-pressure stainless-steel hose 106 may be pulled by the robotic crawler into the DCSS. Once the crawler has navigated the vent access, the container surface 108 can be inspected and cold spray repair and/or mitigation can be performed within the overpack-to-container annular gap 110. The cold spray repair robotic crawler 104 may deliver a miniaturized cold spray apparatus 112. U.S. Patent Application Publication No. 2014/0117109 discloses a highly suitable cold spray apparatus for the practice of the embodiment of the present disclosure. An illustrative cold spray apparatus 112 is depicted in FIG. 6B. to accomplish in-situ application of cold spray mitigation and repair coatings within the overpack. in some highly suitable implementations of the present disclosure, high pressure gas may be injected into the powder feeder module 114 from the cold spray equipment at the powder feeder gas inlet 116, where powder is fed into the gas, and the powder-gas mixture is injected to the heater module 118 via the powder injection hose 120. High pressure gas is injected into the heater module 118 at the heater injection point 124, where the gas is heated and mixed with the powder-gas mixture. This blend is then injected into a flexible high-pressure gas hose 126, which carries the mixture into the DCSS to the cold spray applicator device 128 attached to the spray robot 130.

Figure 6C:
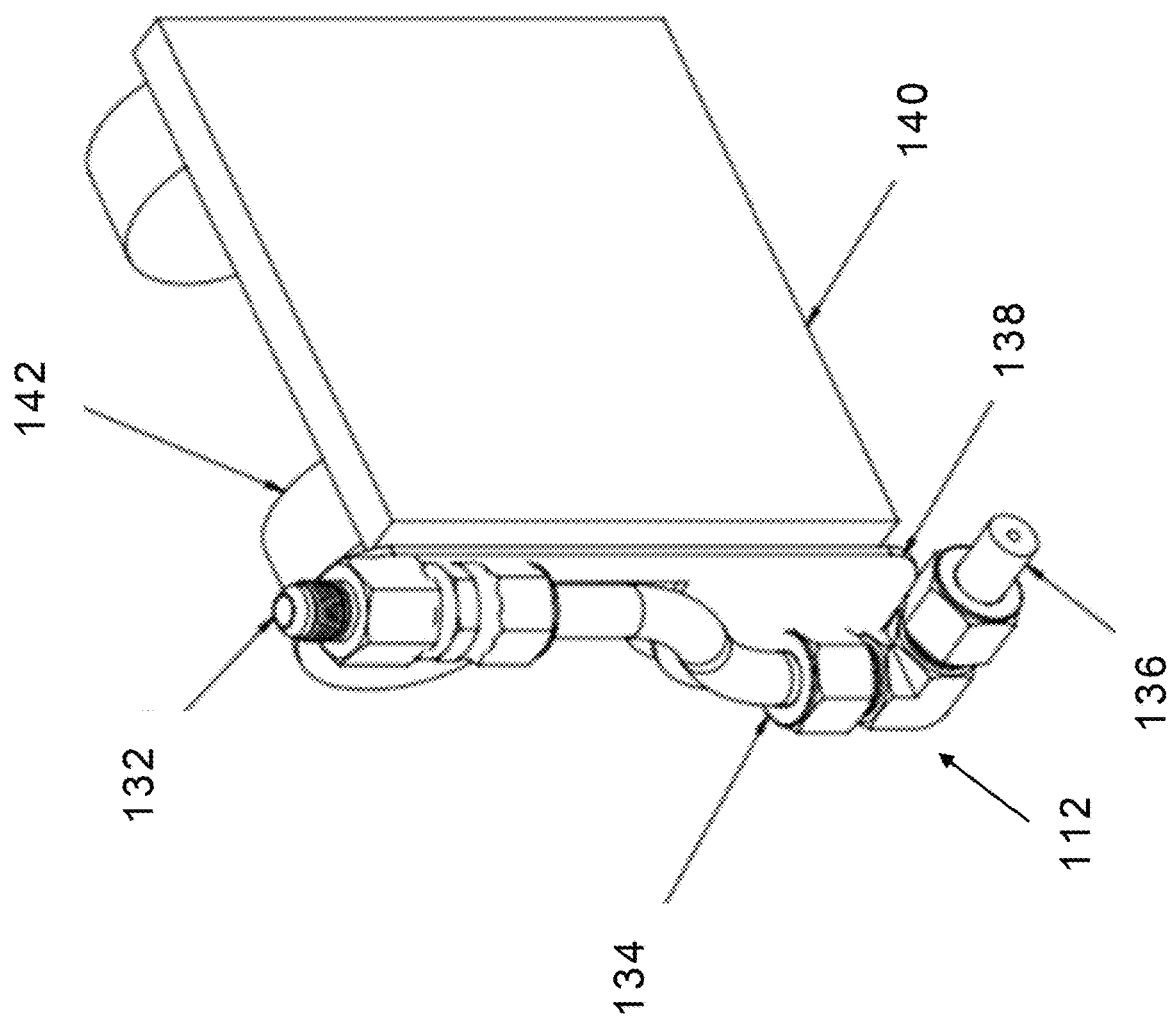

FIG. 6 depicts an illustrative embodiment of a cold spray applicator apparatus. At the applicator, the hot gas powder mixture is injected at the injection point 132, such as is shown in FIG. 6C, where it travels to the applicator body 134 and into the supersonic nozzle 136. The applicator device is attached to the spray robot via heat shield 138 and heat-resistant chassis 140. The crawler may navigate the container surface of the HWC via magnetic wheels 142 or using suction or some other mechanism. Significantly, the size and shape of the applicator apparatus may be configured to navigate not only the relatively narrow space of the annular gap between the container surface of the HWC and the overpack container, but also to move through the vent opening in the overpack and then from the vent opening into the annular gap, and these spaces may be oriented substantially perpendicular to each other. In general, the technology utilized to move the robotic vehicle on the container surface should be sufficient to support the weight of the vehicle on the container surface of the HWC and withstand the reaction forces applied to the vehicle by the pressure of the cold spray material flow in a manner that also permits substantially free movement of the vehicle across the surface. Additionally, the vehicle be suitably be able to pull high pressure hose through the vent of the overpack container. As an example, the robotic vehicle may utilize magnetic wheels which exert a magnetic attachment or attraction force with respect to the perimeter wall of the HWC. As a further example, pneumatic wheels may also be utilized on the crawler with sufficient vacuum attachment force to the container surface. Additionally, while a magnetic wheeled remote-controlled robot is disclosed, a plurality of remote control robots are available that use other technologies and structures to accomplish a temporary attachment or connection to the HWC using, for example, vacuum, suction, spring force, and adhesives to provide traction. Examples of robotic vehicles suitable for adaptation for use with cold spray applicator apparatus are available from Robotic Technologies of Tennessee, 1615 Brown Ave. Suite 1, Cookeville, Tenn. 38501.

Further, elements of the robotic vehicle may be suitably resistant to the heat generated and transmitted to the environment and surrounding structures by the cold spray application process, and in particular the heat of the gases utilized. Shielding may be provided on the vehicle to shield heat sensitive elements of the vehicle from the heat generated by the cold spray application process. In some implementations, the cold spray nozzle may have at least one degree of freedom of adjustment for adjusting the point of impact of the flow of powder particles. Those skilled in the art will recognize that aspects of the present disclosure may be practiced using other applicator device designs suitable for supporting a supersonic nozzle, including those which are commercially available tube fittings, custom machined designs, and/or 3D printed designs.

In these implementations, it may be advantageous to utilize "de-tuned" or sub-optimal processing conditions specifically designed to not allow the powder particles to reach critical velocity, thereby prohibiting bonding of the particles to the surface. This technique allows surface preparation of the HWC prior to cold spray coating. This surface preparation technique may remove oxidation, debris, corrosion, and other contamination from the surface. This may also provide an ideal surface cleanliness and roughness to accept cold spray coating. This may improve bonding of the coating to the substrate and eliminate corrosion concerns at the interface from entrapped corrosive species.

EXAMPLES

Example 1

Using the cold spray process, it is possible to deposit many different types of metals and alloys. Aspects of the present disclosure were developed through iterative process improvement of several cold spray materials. The table of FIG. 7D lists several of the materials investigated in this process, including 304L stainless steel, 316L stainless steel, 904L stainless steel, Inconel 625, and Alloy 59. To determine the efficacy of cold spray materials for CISCC prevention, the materials listed in the table of FIG. 7D were cold sprayed on small-scale V-notch welded specimens, comprised of 304L material, ¼" thick, welded with a single pass wire feed process using 308 weld wire. Cold spray coatings of 304L, 316L, 904L, Inconel 625, and Alloy 59 were deposited over the weld and HAZ on a single side of the welded coupon to a thickness of 0.010 to 0.025 inches using previously developed processing conditions with a VRC Metal Systems Gen III high pressure cold spray system. Samples were sprayed with helium or nitrogen processing gas according to their cold-spray ability as previously developed.

The samples were tested using ASTM G36 boiling MgCl testing to generate stress corrosion cracks. This testing is reported to be extremely severe, causing cracking very quickly in crack resistant 304 and 316 stainless steel materials. The testing was conducted using 32% wt. MgCl in deionized H2O, boiling at 120° C. The samples were subjected to ASTM G36 testing for a total of 24 hours.

It was found that the weld residual stresses present in the control sample were sufficient to cause significant pitting, surface cracking, and through-thickness cracks.

Figure 7A:
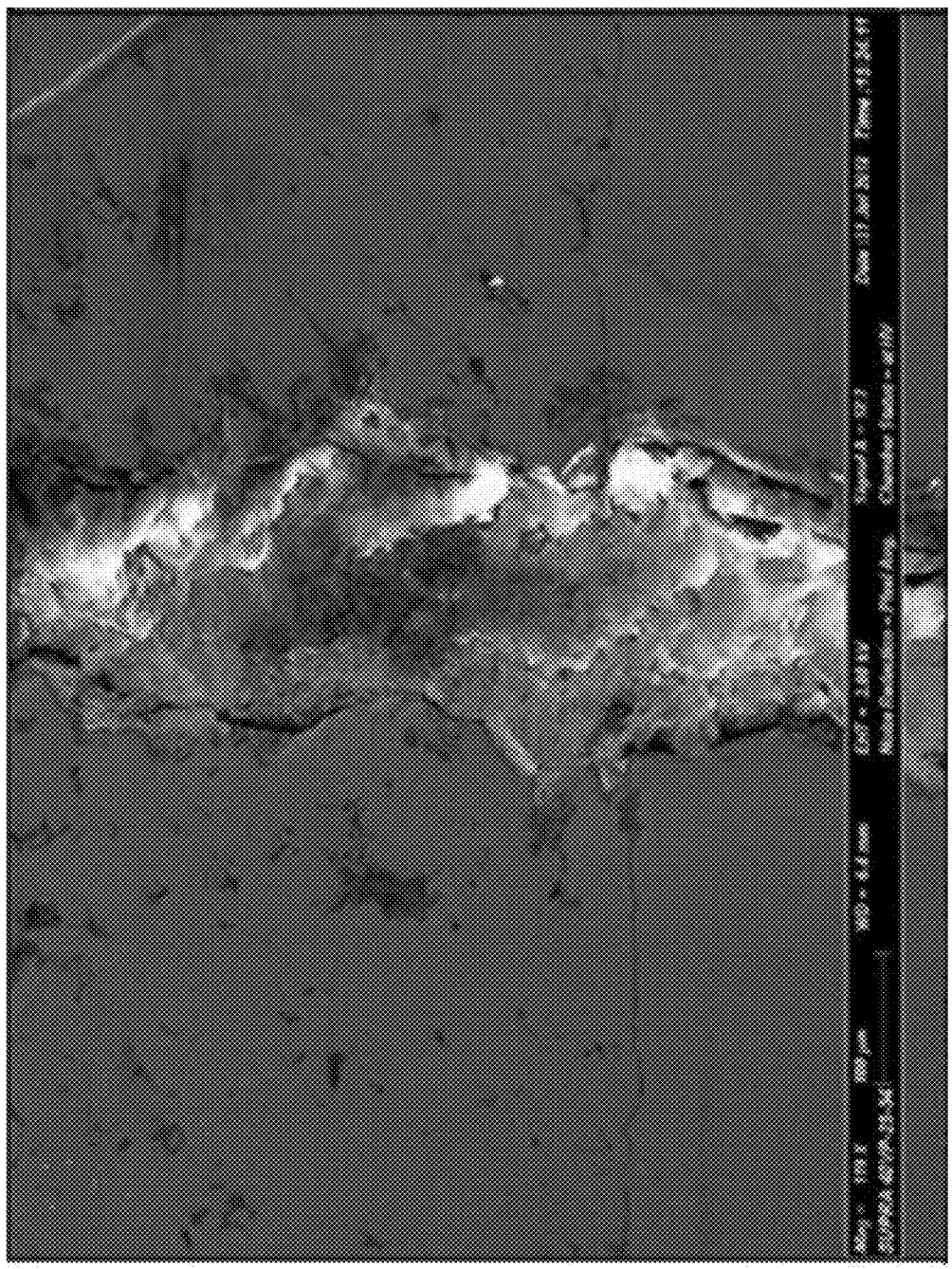
FIGS. 7A through 7C are micrographs of portions of a canister coated utilizing aspects of the cold spray system of the present disclosure in subjected to testing simulating severe conditions.
Figure 7B:
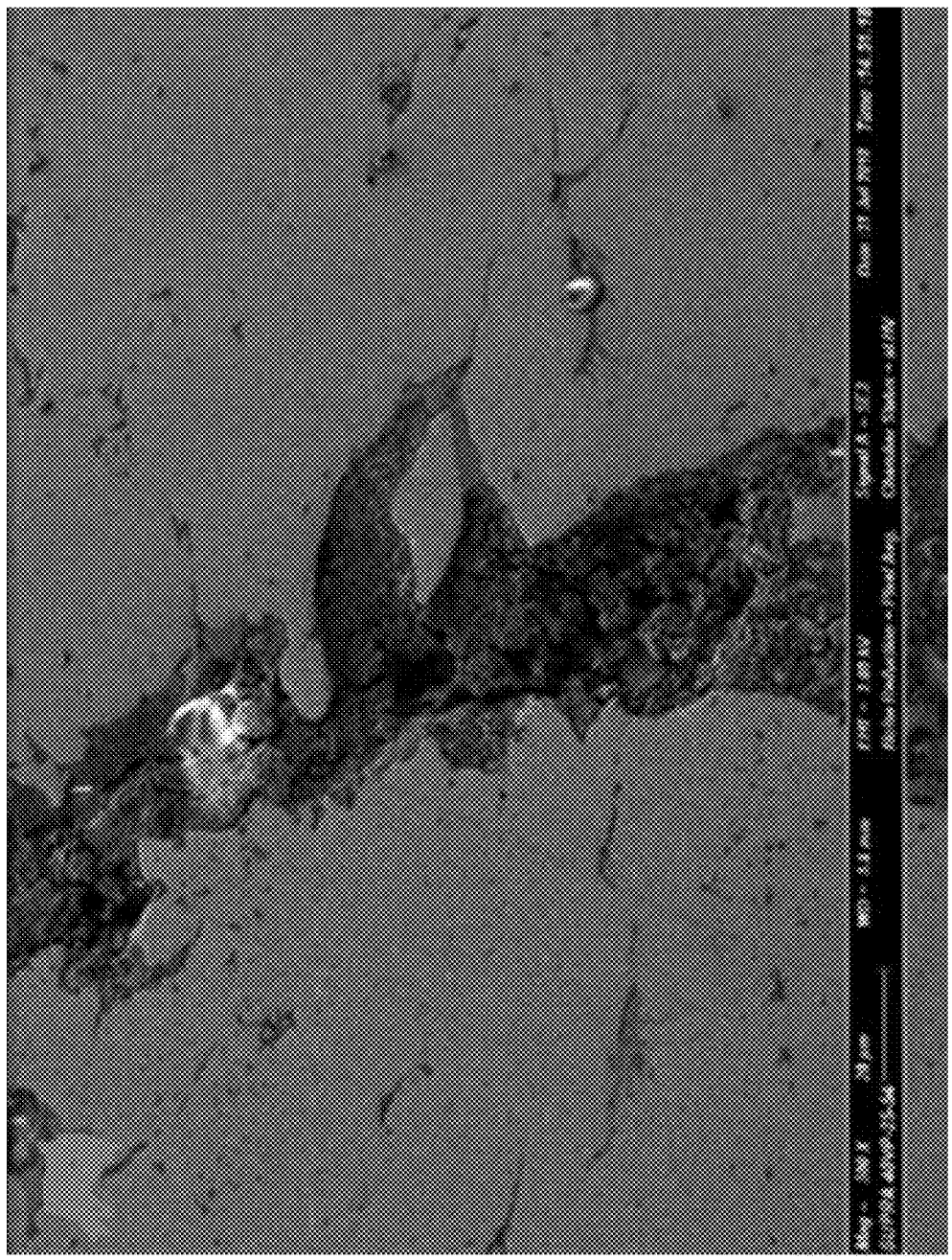
Figure 7C:
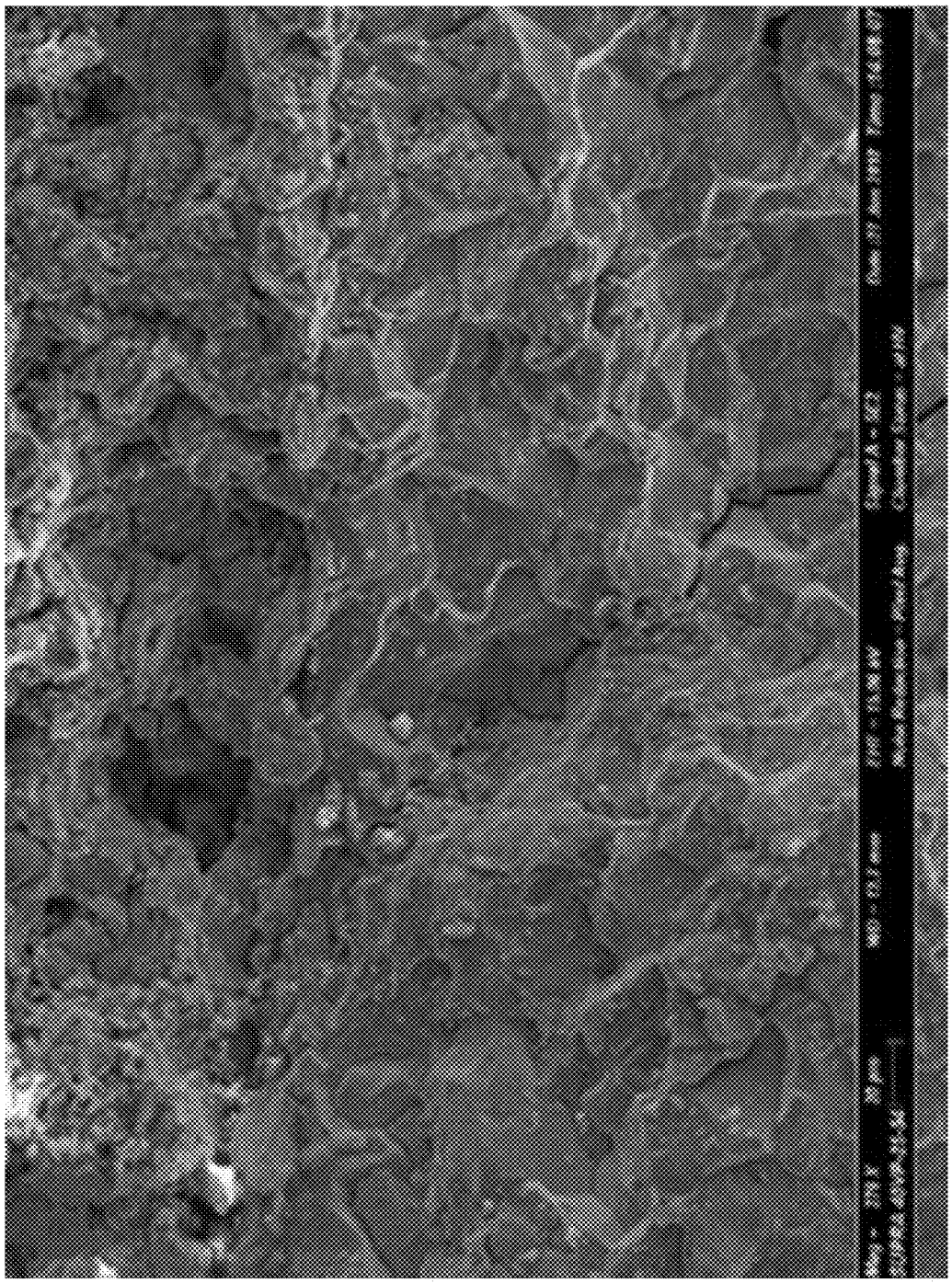
Figure 8:
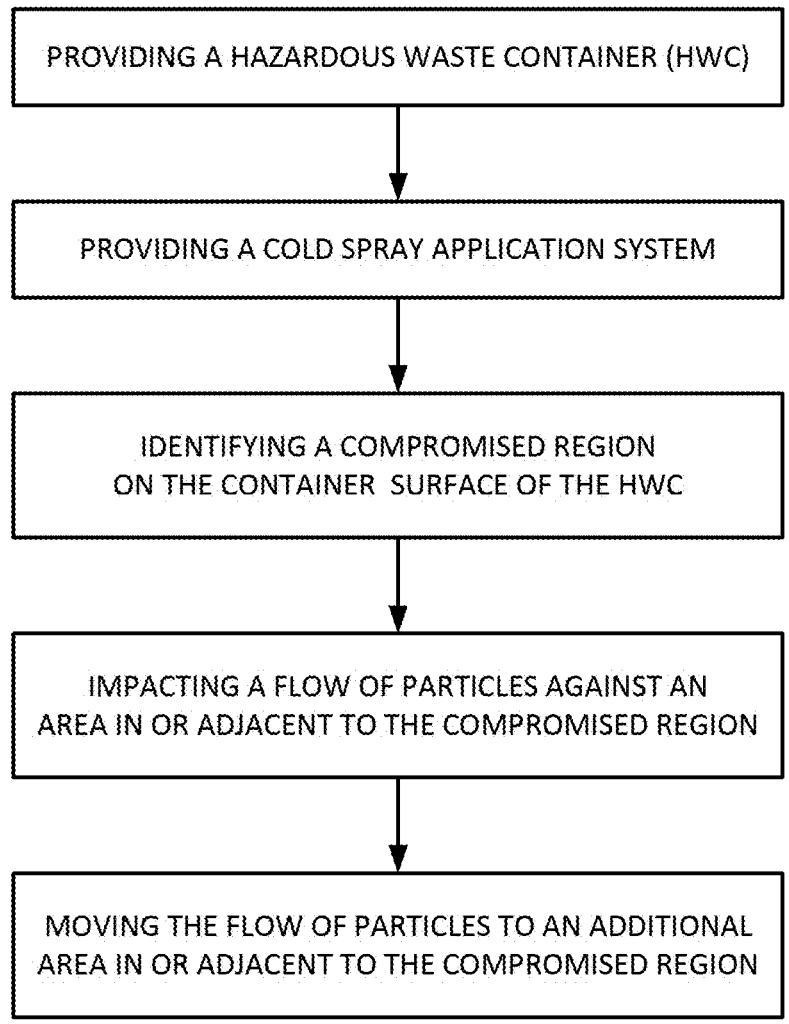
FIG. 8 is a flow diagram of method aspects of the present disclosure.

Cracking was also present in the cold sprayed samples, however in every material, cracking did not originate on the cold sprayed surface. Therefore, the cold sprayed materials are classified as Crack Resistant in the table given in FIG. 7D. Additionally, in all cold sprayed samples, cracking developed on the backside (non-cold sprayed side) of the sample and propagated through the sample thickness. In some cold spray material cases, the propagating crack continued through the cold spray interface and through the coating, as shown in FIGS. 7A and 7B. However, in some cold spray material cases, i.e., 316L, and Inconel 625, the propagating crack was arrested below the cold spray interface, as shown in FIG. 7C. This is a consequence of the compressive residual stresses imparted to the substrate during the cold spray process. These materials were classified as Crack Arresting in the table in FIG. 7D.

The other two significant factors that were used in the down-selection of the materials described in the embodiments of the present disclosure were the galvanic potential and the pitting resistance of the materials. Galvanic potentials and pitting potentials for each of the cold sprayed materials were determined using ASTM G61 Cyclic polarization testing, and they were compared to those of wrought 304L stainless steel determined using the same procedure. Cold spray materials with electrochemical potential within 100 mV of 304L stainless steel were classified as Galvanically Matched. Cold spray materials with pitting potential greater than that of 304L stainless steel were classified as Pitting Resistant.

Results of the down-selection testing is summarized in FIG. 7. This example demonstrates a down-selection process used to reduce the cold spray CISCC invention to practice. The present disclosure comprises a cold spray material that can be applied to a DCSS either pre-service, in-service, and/or in-situ at low temperatures, contains crack-retarding compressive residual stresses, may achieve over 69 MPa adhesive strength with matched galvanic potential and improved pitting potential, making aspects of the disclosure a highly advantageous system for mitigation and repair of CISCC DCSS applications, as well as numerous long term hazardous and nuclear waste storage applications.

Example 2

In a highly advantageous implementation of the present disclosure, the cold spray repair and/or mitigation coating is robotically applied in-situ, which is defined as being applied without moving, manipulating, exposing, or otherwise disturbing the loaded HWC system. In this implementation, the robotic system is used to navigate the vent opening located on the hazardous or nuclear waste storage HWC, e.g. DCSS. Navigation through the vent opening places significant limitations on the size of the apparatus moving through the vent opening, and requires specific miniaturized geometry for embodiments of the disclosure. Illustratively, the robotic crawler must be able to traverse multiple 90° corner features prior to reaching the gap formed between the steel-lined overpack and the HWC to access the stainless-steel HWC itself. The cold spray robot crawler may then navigate in the gap using integrated navigation cameras to the damage site while pulling the flexible cold spray hose.

The techniques of the disclosure are particularly advantageous when applied to an HWC which is designed to contain, or contains, fissile nuclear material, nuclear fuel, spent nuclear fuel, nuclear weapons, irradiated waste, greater than class C waste, vitrified waste, or other radioactive substance for the purpose of storage (short or long term) as well as for transportation. An example of a suitable HWC is a Dry Cask Storage System (DCSS) useful for the storage of spent nuclear fuel. Illustrative DCSS may be suitably formed from materials such as SCC susceptible austenitic stainless steels, which include, which include for example ANSI 304/304L, ANSI 316/316L, and ANSI 308. In an illustrative implementation of the disclosure, the HWC may has an outer diameter of approximately 1.75 m, the annular gap between the container surface of the HWC and the inner surface of the overpack container has a width of approximately 76 mm, the vent in the overpack container has a height of approximately 97 mm, and a vertical distance between the vent location and the top of the HWC is approximately 228 mm.

Further illustrative implementations of the disclosure utilize a cold spray material deposition system which may operate with a working gas temperature of approximately 700° C. or lower (measured at the cold spray nozzle inlet). The deposition system may also operate at a working gas pressure of approximately 1000 psi or lower (measured at the cold spray nozzle inlet) and may utilize, for example, helium, nitrogen, and/or compressed air as the process and carrier gases.

Usage of the techniques of the disclosure may advantageously apply a coating of a corrosion resistant material to the container surface of the HWC that is less susceptible to corrosion damage than the material of the container surface, and imparts or applies to the container surface a compressive residual stress which beneficially discourages cracking in the material Broadly, such cold spray application materials may include powder feedstock from the group of pure metal powders including titanium, chromium, cobalt, nickel, copper, zinc, niobium, molybdenum, silver, and tantalum. Additional cold spray application materials may include powder feedstock selected from the group of Fe, Ni, and/or Cr containing metal alloy powders including 304/304L Stainless Steel, 316/316L/316Ti Stainless Steel, 904L Stainless Steel, 321 Stainless Steel, 410 Stainless Steel, 2205 duplex stainless steel, Alloy C-276, Alloy K-400, Alloy K-500, Alloy 22, Alloy 59, Alloy 600, Alloy 625, Alloy 718, or other Ni—Cr—Mo alloys. Some of the most suitable materials for the techniques of the disclosure include a Ni—Cr—Mo pure ternary alloy having approximately 59 percent to approximately 64 percent Ni, approximately 20 percent to approximately 23 percent Cr, and approximately 16 percent to approximately 18 percent Mo, which is commonly referred to as Alloy 59. The cold spray application material may utilize powder feedstock containing materials having high neutron absorption cross-section, such as those containing boron, gadolinium, and hafnium.

Further, the cold spray application material may utilize ceramic hard phase powders including ceramic materials selected from the metallic carbides, including: chromium carbide, tungsten carbide, titanium carbide, molybdenum carbide, hafnium carbide, niobium carbide, tantalum carbide, tantalum niobium carbide, zirconium carbide, vanadium carbide, boron carbide, lanthanum carbide, manganese carbide, silicon carbide, tungsten tantalum carbide, tungsten titanium carbide, and tungsten titanium tantalum carbide. Ceramic materials may be selected from the metallic oxides, including aluminum oxide, aluminum titanate, chromium oxide, yttrium oxide, zirconium oxide, titanium dioxide, silicon dioxide, magnesium oxide, bismuth oxide, cesium oxide, cobalt oxide, copper oxide, iron oxide, gallium oxide, hafnium oxide, niobium oxide, tantalum oxide, tin oxide, zinc oxide, and manganese oxide.

Some of the most highly suitable materials utilizing the ceramic hard phase may comprise the metal carbides of chromium, tungsten, niobium, tantalum, and hafnium, and metal oxides of zirconium and aluminum. Ceramic materials with high neutron absorption cross-sections may also be utilized, and may include boron carbide, boron nitride, gadolinium oxide, and hafnium carbide. The hard phase ceramic additions may be added, blended, milled, or otherwise included in the aforementioned metal matrix materials for cold spray usage in the implementation of the disclosure.

The techniques of the present disclosure may be utilized for creating embedded flaw-type repairs in which the flaw in the container surface is substantially completely encased by the material of the cold spray coating, which may mitigate further damage to the perimeter wall of the HWC at the damage site.

Techniques of the disclosure may be implemented on a HWC prior to placement of the HWC into service as a storage container in order to mitigate or resist corrosion and other damage to the container surface of the HWC. The techniques may also be adapted to use on HWC which have been placed in service as a storage container and contain hazardous material for purposes of repairing existing damage to the container surface of the HWC such as, for example, pitting, cracking, fretting, scratching, or other corrosion or damage, as well as mitigation of future damage. Techniques of the disclosure may be implemented to apply cold spray material within the interior space of the overpack, and may be utilized with horizontally-oriented DCSS and vertically-oriented DCSS.

The nozzle of the cold spray applicator may be moved in a pattern over the container surface to create a patch of cold spray coating on the surface. In some of the implementations of the disclosure, the cold spray coating is applied over the welded joints and heat affected areas adjacent to the welded joints, and may include circumferential and longitudinal welds on the HWC. In further implementations, the cold spray coating may be applied over the entire, or substantially the entire, outer surface of the HWC. In such implementations, the nozzle of the applicator may be moved in a substantially linear pattern generally corresponding to the location of the welded joint. In some implementations of the disclosure, the cold spray coating is applied on the container surface at sites of pitting, cracking, fretting, scratching, or other corrosion or damage sites or sites to repair and mitigate further corrosion. In such implementations, the nozzle of the applicator may be moved in a pattern which cycles back and forth in adjacent lines over the area of the container surface to be treated.

In general, the present disclosure may provide a method of forming a coating on at least a portion of a hazardous waste container (HWC) which has a perimeter wall with a container surface. The HWC may be positioned in an overpack container, and the overpack container may have an inner surface which defines a chamber for receiving the HWC. An annular gap may be formed between the container surface of the HWC and the inner surface of the overpack container. The method may include providing the HWC, and the HWC may be in a pre-service condition without hazardous contents, or may be in an in-service condition with hazardous contents. An in-service HWC may be partially or fully positioned in the overpack container.

The method may also include providing a cold spray application system which may include a cold spray apparatus which is configured to generate a high-pressure gas flow carrying particles to impact the container surface of the HWC at a contact spot on the container surface to thereby form a coating on the container surface. The cold spray apparatus may be configured to generate a substantially linear flow of the particles against the container surface at or about the contact spot. Illustratively, the cold spray apparatus may comprise a gas supply which is configured to supply a gas for use in the cold spray process in which may be supplied at a high pressure. The cold spray apparatus may additionally include a gas control module which is configured to divide the gas supply into a process gas flow and a carrier gas flow, and a heater module may be configured to heat the process gas flow. A powder feeding module of the cold spray apparatus may be configured to feed particles of a cold spray powder into the carrier gas flow, and a mixing module may be configured to mix the heated process gas flow and the powder—containing carrier gas flow together into a combined gas flow. A nozzle of the cold spray apparatus may have an outlet from which a stream of gas and powder particles exits the cold spray apparatus to the contact spot on the container surface of the HWC. The outlet of the nozzle may be positionable in opposition to a desired location for the contact spot on the container surface. The nozzle may receive the combined gas flow from the missed mixing module via a conduit connecting the nozzle to the mixing module.

The cold spray application system may include a mobile applicator apparatus which is configured to carry at least the nozzle of the cold spray apparatus to a cold spray application site such that the contact spot of the cold spray apparatus generally aligned with the application site. The mobile applicator apparatus may comprise a mobile base which may include a frame, a plurality of wheels which are rotatably mounted on the frame, with at least one of the wheels having an ability to adhere (or otherwise be attracted) to the container surface of the HWC. The mobile base may also include a motivating element operatively connected to at least one of the wheels to cause rotation of the wheel and movement of the mobile base across the container surface of the HWC. Illustratively, the motivating element may comprise a motor, although the motor may be powered in other ways including utilizing pneumatic power or hydraulic power.

Methods of the present disclosure may also include identifying a compromised region on the container surface of the perimeter wall of the HWC. The compromised region may include a welded joint in the perimeter wall, and may extend to a heat affected zone (HAZ) adjacent to the welded joint, and the compromised region may include a damage site which may have been affected or created by corrosion of the perimeter wall of the HWC. Additionally, the methods may include impacting a substantially linear flow of the particles of the cold spray powder against an area in or adjacent to the compromised region of the container surface in a manner that is effective to cause at least some of the particles of the powder to bond to the container surface of the wall to produce a coating on the area of the compromised region. This may include aligning the contact spot of the cold spray apparatus with the area in or adjacent to the compromised region. Further, the methods may include moving the substantially linear flow of particles in a direction that is substantially parallel to the container surface of the perimeter wall to cause the particles of the powder to impact an additional area in or adjacent to the compromised region of the container surface in order to cause the particles of the powder to bond to the surface of the additional area of the compromised region.

The techniques of the present disclosure may also be utilized for surface preparation while employing sub-optimal processing conditions such that the powder particles do not reach critical velocity or bond. This technique may remove oxidation, debris, corrosion, and other contamination from the surface and provide an ideal surface cleanliness and roughness to accept cold spray coating. This technique may improve bonding of the coating to the substrate and eliminate corrosion concerns at the interface from entrapped corrosive species.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A method of providing a repair to a hazardous waste canister (HWC) having a perimeter wall with an outer surface, the HWC being received in a chamber defined by an inner surface of an overpack container, the method comprising:

providing an application system including:
  a cold spray apparatus configured to generate a high-pressure gas flow carrying particles, the cold spray apparatus including a nozzle having an outlet from which a stream of gas and powder particles exits the cold spray apparatus; and
  a mobile applicator apparatus configured to carry at least the nozzle of the cold spray apparatus to a cold spray application site, the mobile applicator apparatus including a mobile base with a frame and a plurality of wheels rotatably mounted on the frame;
positioning the nozzle of the cold spray apparatus in a gap between the outer surface of the perimeter wall of the HWC and the inner surface of the overpack container by at least one wheel of the plurality of wheels holding the mobile applicator apparatus against one of the surfaces forming the gap;
emitting a substantially linear flow of particles of a powder from the nozzle of the cold spray apparatus toward an area in the compromised region of the outer surface of the perimeter wall to impact the particles of the powder against the area of the outer surface of the perimeter wall in a manner effective to cause the particles of the powder to bond to the outer surface of the perimeter wall to produce a coating on the area of the outer surface of the perimeter wall; and
operating the mobile applicator apparatus to move the nozzle of the cold spray apparatus and the substantially linear flow of particles emitted from the nozzle in a direction substantially parallel to the outer surface of the perimeter wall to cause the particles of the powder to impact an additional area of the outer surface of the perimeter wall to cause the particles of the powder to bond to the additional area of the outer surface of the perimeter wall and create a substantially continuous coating in an extended area which includes the area and the additional area of the outer surface of the perimeter wall.

2. The method of claim 1 additionally comprising:
impacting the substantially linear flow of particles of the powder sprayed from the nozzle of the cold spray apparatus against the area in the compromised region of the outer surface of the perimeter wall in a manner effective to cause the particles of the powder to remove material from the outer surface of the perimeter wall prior to material deposition on the outer surface of the perimeter wall; and
moving the nozzle of the cold spray apparatus in the gap with respect to the outer surface of the perimeter wall from one position adjacent to the compromised region of the outer surface of the perimeter wall to another position adjacent to the compromised region of the outer surface of the perimeter wall to thereby cause the particles of the powder to impact the additional area of the compromised region of the outer surface of the perimeter wall and remove material from the outer surface of the additional area of the compromised region of the perimeter wall.

3. The method of claim 1 wherein the compromised region of the outer surface of the perimeter wall of the canister comprises a portion of the outer surface of the perimeter wall which exhibits damage to the perimeter wall.

4. The method of claim 1 wherein the compromised region of the outer surface of the perimeter wall the canister includes a portion of the outer surface of the perimeter wall which exhibits at least one characteristic selected from the group of corrosion, cracking, stress corrosion cracking, fretting, wear, scratching, pitting, and chlorine induced stress corrosion cracking.

5. The method of claim 1 wherein the compromised region includes at least one of a welded joint, a heat affected area of a welded joint, and a portion of the outer surface of the perimeter wall susceptible to corrosion and stress corrosion cracking.

6. The method of claim 5 wherein impacting the substantially linear flow of the particles of the powder against the extended area of the outer surface of the perimeter wall is performed in a manner creating compressive residual stress in the extended area of the outer surface of the HWC.

7. The method of claim 1 including selecting a material for the particles of the powder that is less susceptible to corrosion damage than a material forming the outer surface of the perimeter wall of the HWC.

8. The method of claim 1 wherein impacting the substantially linear flow of the particles of the powder against the extended area of the outer surface of the perimeter wall is performed prior to positioning waste material in an interior of the HWC.

9. The method of claim 1 wherein impacting the substantially linear flow of the particles of the powder against the extended area of the outer surface of the perimeter wall is performed while waste material is positioned in an interior of the HWC.

10. The method of claim 1 wherein the cold spray apparatus further includes:
   elements for generating the high-pressure gas flow carrying the particles of the flow, the elements being positioned outside of the overpack container; and
   a conduit extending between the elements and the nozzle carried on the mobile applicator apparatus positioned in the gap to provide the nozzle with the high-pressure gas flow carrying the particles.

11. The method of claim 1 wherein the mobile applicator apparatus further includes:
   a motivating element operatively connected to the at least one wheel of the plurality of wheels to rotate the at least one wheel and cause movement of the mobile base in the gap between the outer surface of the perimeter wall of the HWC and the inner surface of the overpack container.

12. The method of claim 1 wherein the at least one wheel of the plurality of wheels of the mobile applicator apparatus is magnetic in character.

13. The method of claim 2 wherein impacting the particles of the powder against the area of the outer surface of the perimeter wall to cause removal of material from the outer surface of the perimeter wall is performed at a first velocity; and
   wherein impacting the particles of the powder against the area of the outer surface of the perimeter wall to cause bonding of the particles to the outer surface of the perimeter wall is performed at a second velocity capable of causing cold spray bonding of the particles to the outer surface of the perimeter wall; and
   wherein the first velocity is lower relative to the second velocity.

14. The method of claim 1 wherein said moving includes moving the nozzle in portions of the gap located between the top and bottom of the HWC.

15. A method of forming a coating on a hazardous waste canister (HWC) positioned in a chamber of an overpack container, the chamber of the overpack container being defined by an inner surface of the overpack container, the HWC having a perimeter wall with an outer surface positioned in opposition to the inner surface of the overpack container to define an annular gap between the outer surface of the perimeter wall and the inner surface of the overpack container, the gap extending from a bottom of the HWC to a top of the HWC, the method comprising:
   providing an application system including:
      a cold spray apparatus configured to generate a high-pressure gas flow carrying particles, the cold spray apparatus including a nozzle having an outlet from which a stream of gas and powder particles exits the cold spray apparatus; and
      a mobile applicator apparatus configured to carry at least the nozzle of the cold spray apparatus, the mobile applicator apparatus including a mobile base with a frame and a plurality of wheels rotatably mounted on the frame to contact and traverse the outer surface of the perimeter wall of the HWC;
   accessing the outer surface of the perimeter wall of the HWC by positioning the mobile applicator apparatus in the annular gap between the outer surface of the perimeter wall of the HWC and the inner surface of the overpack container;
   identifying a compromised region on the outer surface of the perimeter wall of the canister for material application to the outer surface of the perimeter wall;
   positioning the nozzle of the cold spray apparatus in the annular gap between the inner surface of the overpack container and the outer surface of the perimeter wall of the HWC at a first position adjacent to the compromised region of the outer surface of the perimeter wall;
   emitting, at the first position of the nozzle in the annular gap, a substantially linear flow of particles of a powder from the nozzle of the cold spray apparatus toward an area in the compromised region of the outer surface of the perimeter wall to impact the particles of the powder against the area in a manner effective to cause the particles of the powder to bond to the outer surface of the perimeter wall to produce a coating on the area of the compromised region of the outer surface of the perimeter wall; and
   moving the nozzle of the cold spray apparatus in the gap with respect to the outer surface of the perimeter wall from the first position to a second position adjacent to the compromised region of the outer surface of the perimeter wall;
   emitting, at the second positon of the nozzle in the annular gap, a substantially linear flow of particles of the powder from the nozzle of the cold spray apparatus toward an additional area in the compromised region of the outer surface of the perimeter wall to impact the particles of the powder against the additional area in a manner effective to cause the particles of the powder to bond to the additional area of the outer surface of the perimeter wall to produce a further coating on the additional area of the compromised region of the outer surface of the perimeter wall;

wherein said moving of the nozzle of the cold spray apparatus is performed without moving the HWC with respect to the overpack container.

16. The method of claim 15 wherein the step of moving the nozzle of the cold spray apparatus includes moving the substantially linear flow of particles emitted from the nozzle in a direction substantially parallel to the outer surface of the perimeter wall to cause the particles of the powder to impact the additional area of the compromised region of the outer surface of the perimeter wall at the second position to cause the particles of the powder to bond to the outer surface of the additional area of the perimeter wall and create a substantially continuous coating in an extended area which includes the area and the additional area of the compromised region of the outer surface of the perimeter wall.

17. The method of claim 15 wherein the gap between the outer surface of the perimeter wall of the HWC and the inner surface of the overpack container is thin relative to a thickness of a peripheral wall of the overpack container.

18. The method of claim 15 wherein the gap between the outer surface of the perimeter wall of the HWC and the inner surface of the overpack container is substantially uniform in width from a bottom of the HWC to a top of the HWC.

19. The method of claim 15 wherein the overpack container has a vent in communication with the gap between the outer surface of the perimeter wall of the HWC and the inner surface of the overpack container, and additionally including:

moving the mobile applicator apparatus through the vent in the overpack to position the mobile applicator with the nozzle of the cold spray apparatus in the gap between the outer surface of the perimeter wall of the HWC and the inner surface of the overpack container.

* * * * *